(No Model.)
J. ELLIOTT.
HARROW.
No. 328,576. Patented Oct. 20, 1885.
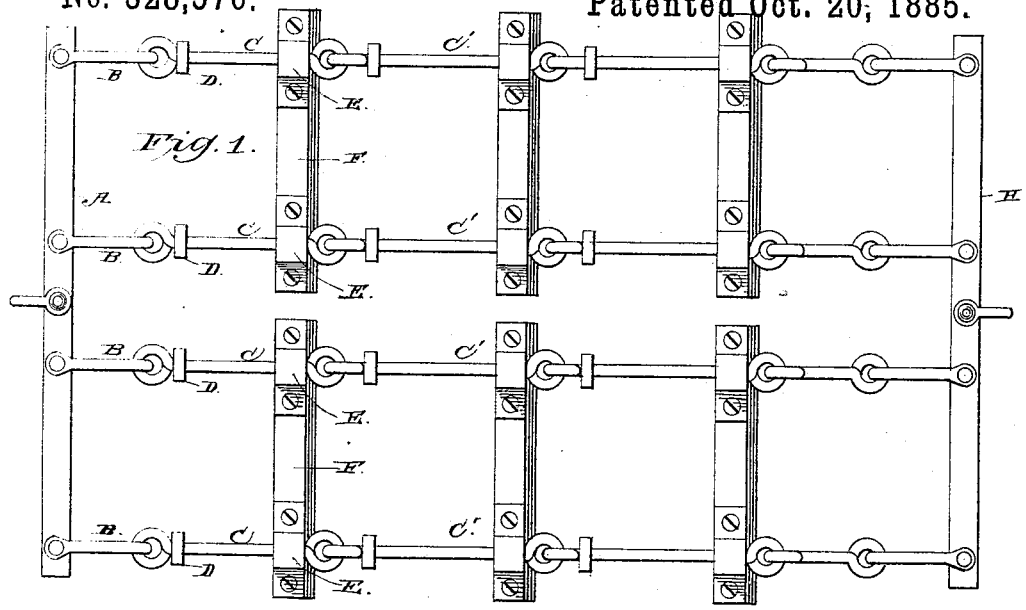
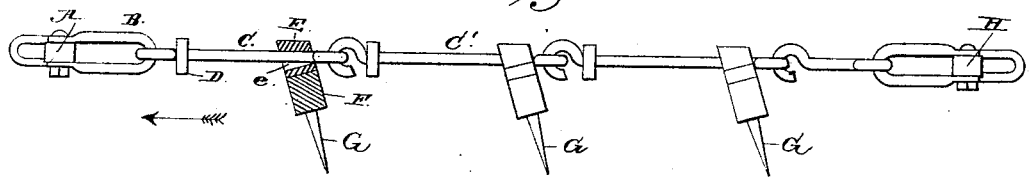
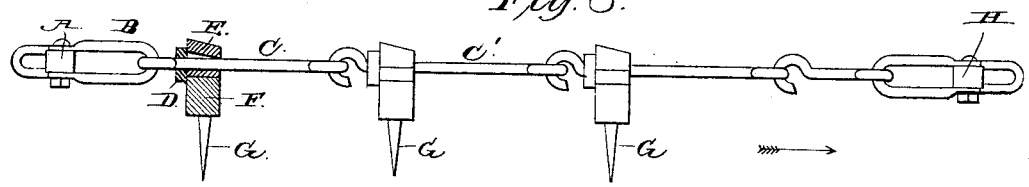
WITNESSES
M. E. Fowler
J. W. Gaines
INVENTOR
James Elliott
By C. A. Snow & Co.
His Attorneys

UNITED STATES PATENT OFFICE.

JAMES ELLIOTT, OF NEWTON, IOWA.

HARROW.

SPECIFICATION forming part of Letters Patent No. 328,576, dated October 20, 1885.

Application filed June 29, 1885. Serial No. 170,156. (No model.)

*To all whom it may concern:*

Be it known that I, JAMES ELLIOTT, a citizen of the United States, residing at Newton, in the county of Jasper and State of Iowa, have invented a new and useful Improvement in Harrows, of which the following is a specification, reference being had to the accompanying drawings.

My invention relates to an improvement in harrows; and it consists in the peculiar construction and combination of devices, that will be more fully set forth hereinafter, and particularly pointed out in the claims.

In the drawings, Figure 1 is a top plan view of a harrow embodying my invention. Fig. 2 is a side elevation of the same, partly in section. Fig. 3 is a similar view showing the teeth reversed.

A represents an evener or draft-bar, having rearwardly-extending loops, B, to which are hooked the rods C, having eyes at both ends, collars D being secured to the rods near one end. These rods pass through blocks E, that are bolted in pairs on the upper sides of beams F, which are arranged parallel to the draft-bar and are provided with harrow-teeth G. That portion of the opening e in each of the blocks, on the side nearest the collar on the rod, is made larger than the opposite side.

To the rear ends of the rods C are hooked similar rods, C', that are provided each with a hook at one end, instead of an eye at each end, and on the rods C' are secured harrow-beams similar to the beams F. Any desired number of rods may thus be jointed together, so as to make the harrow as long as may be required, and to the rear ends of the last section of rods is secured a transverse bar, H, which is similar to the bar A.

It will be readily seen that the harrow-beams are permitted to slide freely on the rods to which they are attached, and that, owing to the openings in the blocks being larger at one end than they are at the other, said beams may be inclined on the rods, so as to cause the teeth to work in the ground at an angle.

When the harrow is drawn from the bar A, the beams slip back against the eyes at the rear ends of the rods and the teeth are caused to work at an angle, as shown at Fig. 2.

When the harrow is drawn from the bar H, the beams bear against the collars at the opposite ends of the rods and the teeth are caused to work vertically in the ground, as shown at Fig. 3.

A harrow thus constructed is light, strong, and very flexible, and thoroughly breaks up clods and pulverizes the earth.

Having thus described my invention, I claim—

1. A harrow composed of the jointed rods having the collars near one end, the sliding blocks on said rods having the openings e, which are larger on the side next the collars than on the opposite sides, and the toothed beams secured to the blocks, for the purpose set forth, substantially as described.

2. The combination of the jointed rods having the collars at one end, the sliding blocks on the rods having the openings e, largest at the end nearest the collars, the toothed beams secured to the blocks, and the draft-bars secured to the rods at the ends of the harrow, substantially as described.

In testimony that I claim the foregoing as my own I have hereto affixed my signature in presence of two witnesses.

JAMES ELLIOTT.

Witnesses:
O. C. MEREDITH,
J. L. OGG.